United States Patent [19]

Yung

[11] Patent Number: 4,867,259
[45] Date of Patent: Sep. 19, 1989

[54] WEIGHT SCALES AND STRAIN GAUGE ASSEMBLIES USABLE THEREIN

[75] Inventor: Richard C. S. Yung, Aberdeen, Hong Kong

[73] Assignee: Fyrnetics, Inc., Elgin, Ill.

[21] Appl. No.: 93,343

[22] Filed: Sep. 4, 1987

Related U.S. Application Data

[63] Continuation-in-part of Ser. No. 689,377, Sep. 4, 1984, Pat. No. 4,691,794.

[51] Int. Cl.$^4$ .................. G01G 3/14; G01G 21/24
[52] U.S. Cl. .................. 177/211; 177/255; 177/DIG. 9
[58] Field of Search .................. 177/211, 255, DIG. 9

[56] References Cited

U.S. PATENT DOCUMENTS

| | | | |
|---|---|---|---|
| 4,457,385 | 7/1984 | Provi | 177/211 |
| 4,458,771 | 7/1984 | Hanssen et al. | 177/DIG. 9 |
| 4,650,016 | 3/1987 | Andriewsky | 177/211 |

*Primary Examiner*—George H. Miller, Jr.
*Attorney, Agent, or Firm*—Robert E. Browne

[57] ABSTRACT

A strain gauge assembly of the type having an elongate flexible member (12) with attached strain gauges (36, 38) has forces applied thereto at points (48, 50) spaced from its central neutral plane (52) by means including members mounted to a foot (10) and force receiving (14) members for non-sliding lateral movement relative thereto. In another embodiment strain gauges are attached to a flexible diaphragm (68) which is in communication with a fluid contained within a flexible sealed container (78) that is restrained against lateral movement by a hollow restraint member (62) therearound but which has a portion (80) protruding from a lower open end (66) thereof to receive a load to pressurize the fluid for flexing the diaphragm (68). A weight scale suitable for employment of the above strain gauge assemblies has an electronic adder (91) summing the loads of a plurality of strain gauge assemblies (92) of load modules to produce a total load signal which is applied to an electronic display (90) for provision of a visual indication of weight. In another embodiment, the flexible members are suspended between fixed support members and floating force transmitting members.

10 Claims, 4 Drawing Sheets

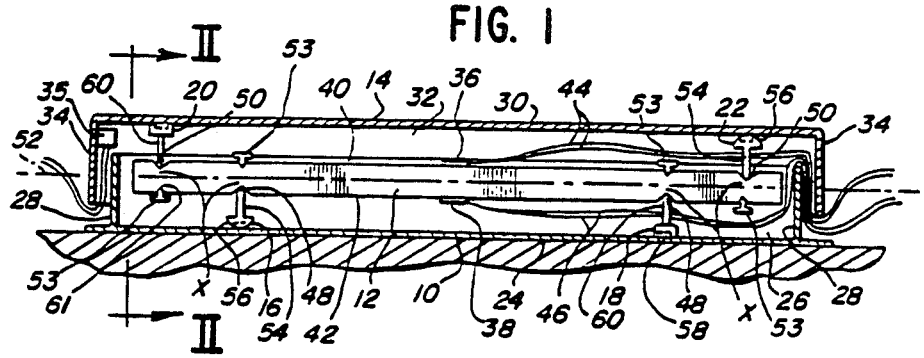
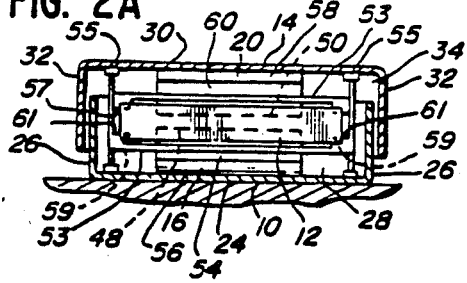
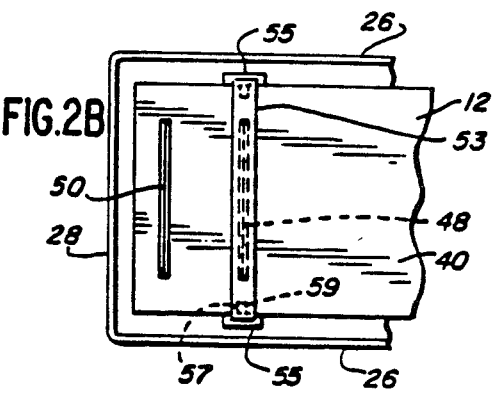
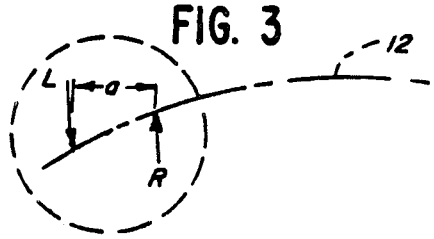
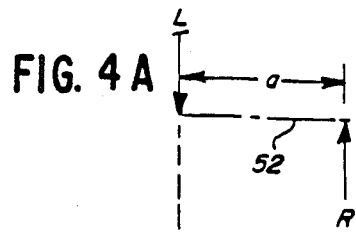
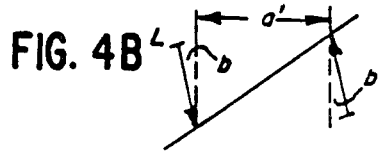
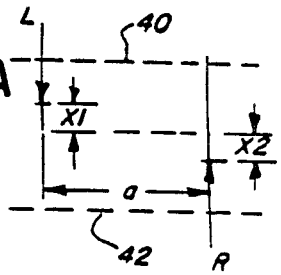
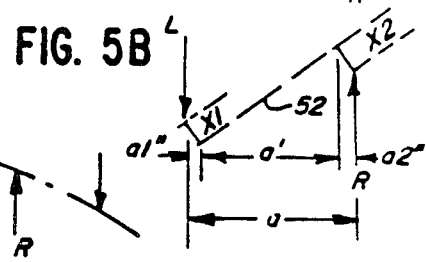

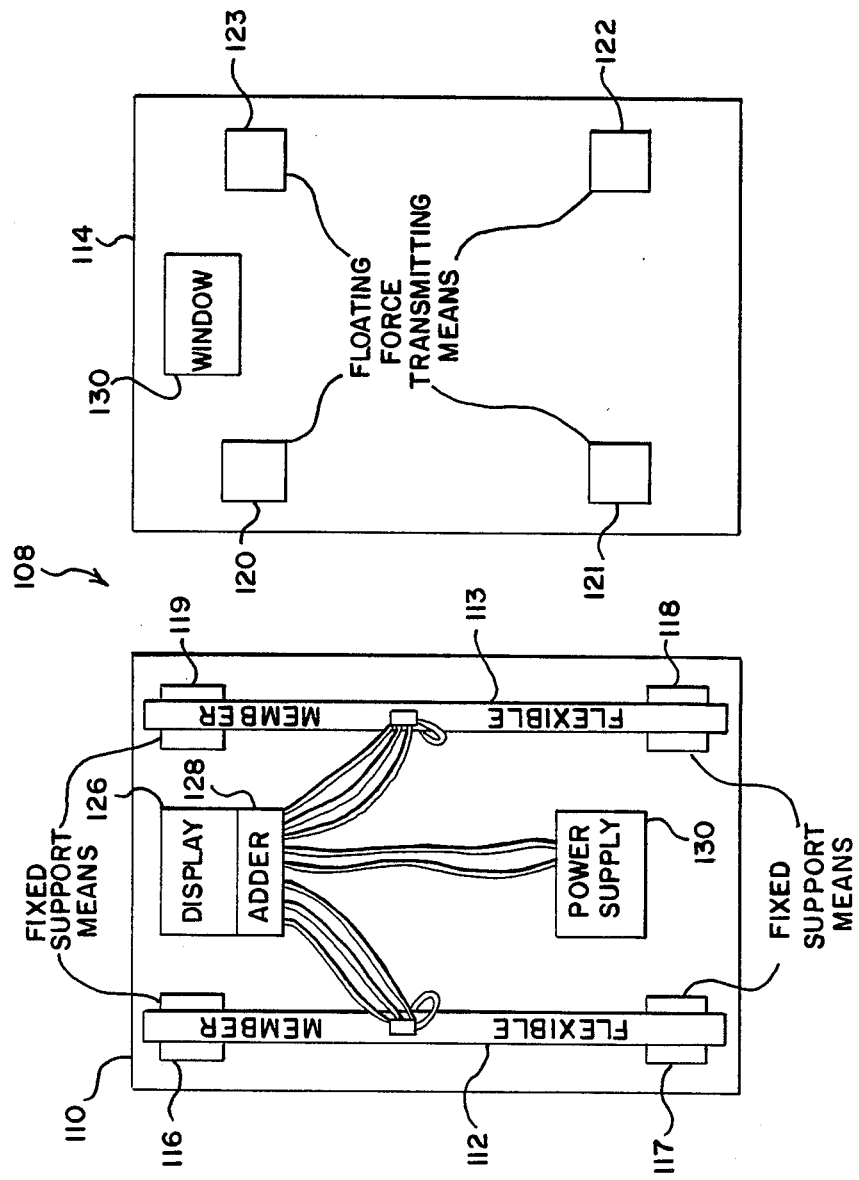

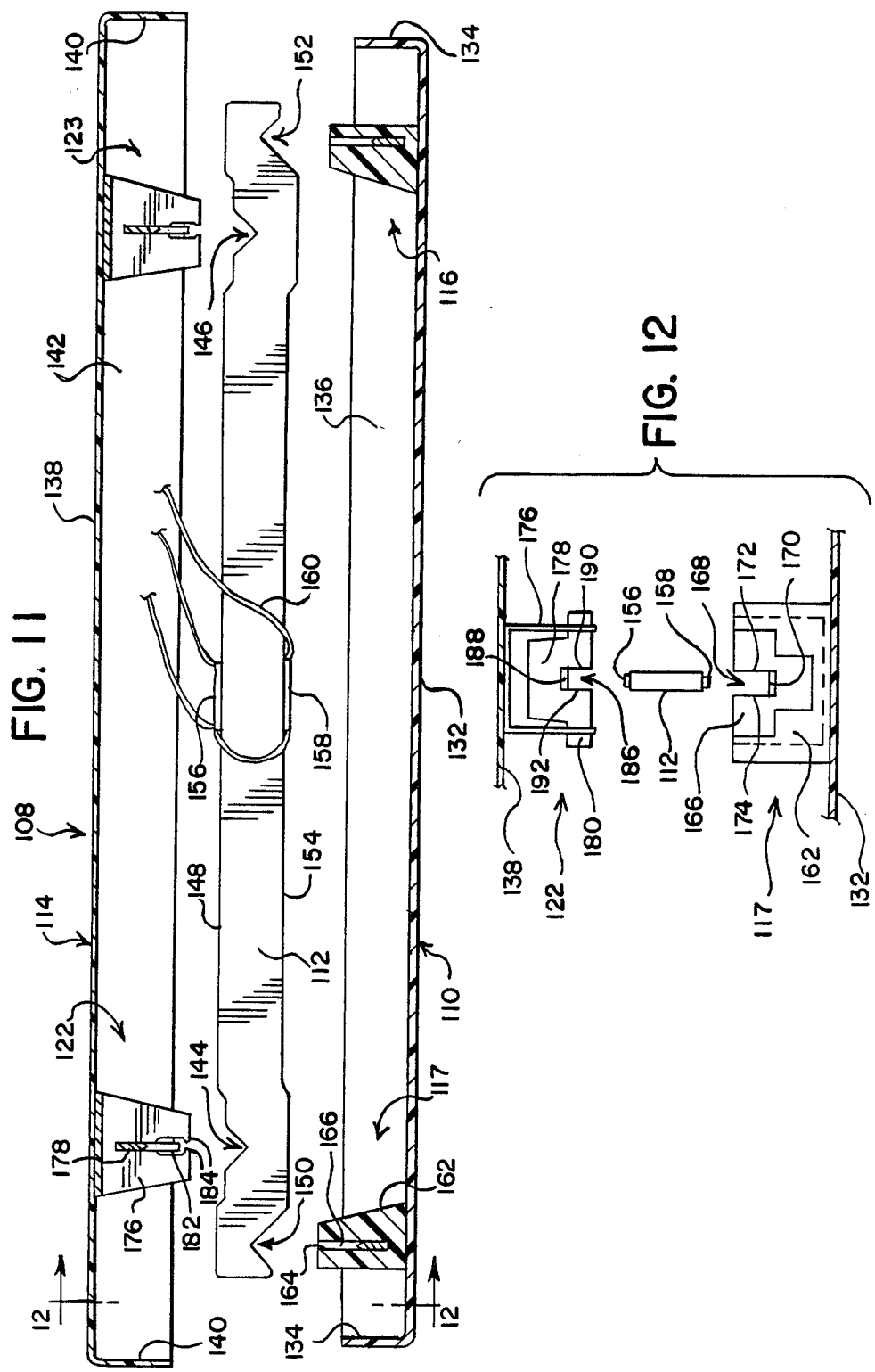

WEIGHT SCALES AND STRAIN GAUGE ASSEMBLIES USABLE THEREIN

This application is a continuation-in-part of application Ser. No. 689,377, filed Sept. 4, 1984, now U.S. Pat. No. 4,691,794.

BACKGROUND OF THE INVENTION

This invention generally relates to weight scales and, more particularly, to electronic weight scales and strain gauge assemblies used therein.

Electronic weight scales are well known which employ strain gauges that are attached to a flexible member. Compression or stretching of the strain gauge during flexing of the member causes it to change resistance which is related to the load, or weight, causing the member to flex. This resistance change is then sensed and applied to an LED or other suitable display for visually indicating the weight placed on the scale.

In particular, it is known to employ an elongate, flexible, cantilevered beam which is tightly secured to a rigid frame at one end and which receives a load intermediate the secured end and its distal end that causes it to flex and thereby energize a strain gauge attached thereto. In order to prevent excessive flexing, it is often necessary to provide the flexible, cantilevered beam with a substantial thickness which prevents incorporating it in a scale of desirable low profile. Customarily, the load is applied to the beam at a single fixed point spaced a substantial relative distance from the fixed end which defines a single movement arm. The precise length of this movement arm is critical for accurate measurement but is difficult to achieve. In addition, non-linearity in the relationship between the load and amount of resultant flexing is caused by the flexing. As the beam flexes more, an increasing large component of the load force becomes directed along the length of the beam instead of transverse to the beam. Further, since the force is applied to only one point on the beam, uniform distribution of the load to this one point is difficult to achieve.

An electronic scale is known which alleviates some of these problems but which has other disadvantages. In this electronic scale, the ends of an elongate flexible member with a strain gauge are torqued, or rotated, in opposite directions to cause the intermediate portion of an elongate flexible member to flex downwardly in response to a load. The ends pass through slots through intermediate portions of elongate axis in response to a load. These arms are supported on one side by knife edge supports and receive loads at their other sides through knife edge load transmission members to cause them to twist and thus apply a torque to the ends of the flexible member at the edges of the slots.

This approach may enable a lower profile than the cantilevered structure noted above and achieves a certain degree of load distribution by virtue of the spaced, elongate arms. However, position of the flexible member relative to the edges of the slots in the arms is not fixed and nonlinearities are still introduced. Such nonlinearities are introduced in part because of high friction sliding movement between the arms and the flexible member which resist flexing to an increasing degree with increasing loads. In addition, the flexing of the member causes apparent foreshortening between the load points which introduces further nonlinearities.

A further problem with known weight scales is that only the scale housing protectively encloses the relatively fragile strain gauges. Accordingly, the strain gauges are relatively unprotected prior to assembly or during repair when the housing is removed. In addition, known scales are constructed in a way which does not facilitate substantial subassembly of modular units and the cost reducing advantages resultant therefrom.

Also, these prior weight scales use a combination of flexible members, underlying support members and overlying force transmitting members that, although relatively simple and inexpensive, could be better arranged to reduce manufacturing and assembly costs. For example, U.S. Pat. No. 4,457,385 to Provi discloses four bell crank assemblies to transmit the weight of a person to its sole load sensing beam that flexes horizontally. U.S. Pat. No. 2,899,191 to Hunt discloses a pair of spaced, smooth beam members that flex vertically. The smooth beams rest on four underlying fulcrum edges and the user's weight is transmitted to the beams by journalled lugs.

SUMMARY OF THE INVENTION

It is therefore a principal object of the present invention to provide weight scales and strain gauge assemblies which solve or alleviate the problems and disadvantages of known electronic scales and strain gauge assemblies.

In keeping with this objective, a weight scale having a housing and a display responsive to a strain gauge signal for visually indicating weight measured by the scale is provided with an improved strain gauge assembly comprising a flexible member with a strain gauge attached thereto to provide an electrical signal in response to the flexing of the flexible member, a foot member in underlying relationship with the flexible member, a load receiving member in overlying relationship with the flexible member, a pair of support members connected with the foot member for supporting the flexible member at a pair of spaced locations associated therewith, and a pair of load transmitting members connected with the load receiving member for transmitting a load therefrom to the flexible member at two locations spaced from one another and from the pair of locations associated with the foot member.

In a preferred embodiment, a strain gauge assembly is provided comprising a foot member, a load receiving member, a flexible member with a strain gauge attached thereto and means for interconnecting the flexible member with the foot member and the load receiving member including an interconnecting member mounted between the flexible member and at least on of the foot member and the load receiving member for movement relative thereto.

Preferably, an interconnecting support member is mounted to the foot member for rocking movement relative thereto, and an interconnecting force transmitting member is mounted to the force receiving member for rocking movement. This rocking movement substantially reduces the amount of frictional force resisting the movement of the flexible member relative to sliding movement. Accordingly, the movement is smoother and more responsive to the flexing of the flexible member. This reduces non-linearity otherwise caused by high frictional force in known strain gauge assemblies.

Another objective of the present invention is to provide a strain gauge assembly with means for compensating for the inherent foreshortening of the flexible member between the points of application of force. Unlike known devices, this is achieved by making connection of support members an force transmitting members at fixed locations on the flexible member offset from the neutral plane and spaced from the surface of the elongate member. This reduces the amount of movement required by the movable support members and force transmitting members and thereby reduces the frictional force resisting movement of the flexible member. This thus further reduces non-linearity.

In a preferred embodiment, a strain gauge assembly is provided with a frame member, a flexible member having a pair of opposite surfaces substantially equidistant from a central plane thereof, a first notch extending from one of the surfaces to within a preselected distance from the central plane and a second notch extending from the other of the surfaces to within another preselected distance from the central plane, a strain gauge mounted to one of the surfaces, a pair of support members mounted to the frame member and extending into the first notch to support the flexible member at the preselected distance form the central neutral plane, means for transmitting a load to the flexible member including a load receiving member in overlying relationship with the flexible member and a load transmitting member mounted to the load receiving member and extending into the second notch to transmit force received by the load receiving member to the flexible member at the other preselected distance from the central neutral plane. Preferably, the preselected distances are equal to one another.

It is also an objective of the present invention to provide a strain gauge sub-assembly comprising an elongate flexible member having a pair of surfaces equidistant from a central neutral plane thereof, a strain gauge mounted to at least one of the pair of surfaces, and a pair of notches in each of the pair of surfaces extending into the flexible member to a preselected distance form the neutral plane.

Yet another object of the present invention is to provide a strain gauge assembly in which the flexible member and strain gauges are protectively enclosed by the foot member and load receiving member which interconnect to form a self-contained module. In keeping with this objective, in a preferred embodiment, a strain gauge assembly is provided that comprises a load receiving member having an open face opposite a main wall between a pair of spaced sidewalls, a foot member having an open face opposite a main wall between a pair of sidewalls, a flexible member with a strain gauge attached thereto and means connected with the main walls of the frame member and load receiving member for mounting the flexible member in force receiving relationship therebetween and protectively enclosed by both of said pairs of sidewalls. Preferably, additional pairs of sidewalls are provided which interconnect the first mentioned pair of sidewalls to form the load receiving members and frame members into rectangular boxes, one of which interfits within the other. In this fashion, the strain gauge, support and load transmitting members and flexible member are protectively surrounded by sidewalls. This construction also improves the rigidity of the load receiving member and the foot member.

It is also an object of the present invention to provide an electronic weight scale having a housing and display mounted to the housing for providing a visual indication of weight in which an improvement is provided comprising a plurality of self-contained load modules, each of which includes a strain gauge for sensing weight, an electronic adder connected with each of the strain gauges of the plurality of load modules for producing a total weight signal proportional to the total weight sensed by the strain gauges and means for connecting the average weight signal to the display to cause visual display of the average weight represented thereby. This approach overcomes the problems of weight distribution and averaging attempted by mechanical means in known devices.

Still another object of the present invention is to provide a strain gauge assembly which employs a flexible diaphragm and means for receiving and uniformly distributing a load to the diaphragm. This objective is achieved by provision of weight scale having a housing in which the improvement is a combination of elements mounted to the housing, comprising, a load receiving member, a flexible member with a strain gauge attached thereto, a sealed, flexible, fluid container containing a fluid in pressure communication with the flexible member, means for increasing the pressure in the container to flex the flexible member in response to application of a load to the load receiving member, and means responsive to the strain gauge for providing an indication of weight.

Preferably, such a strain gauge assembly is provided with a lateral restraint member having a pair of opposite upper and lower open ends, a flexible diaphragm having a strain gauge attached to a surface thereof to provide an electrical indication of weight, means for mounting the diaphragm to the restraint member to close the upper end, a sealed flexible container of a fluid having a portion partially contained within the restraint member and in pressure communication with the flexible diaphragm at the upper end and another portion protruding from the lower open end to support the restraint member above a floor surface against the load and means spaced from the flexible diaphragm for applying a downwardly directed load to the restraint member, such load causing the flexible container to be pressed upward by the sealed flexible container to apply fluid pressure to the diaphragm in relation to the load.

Another object of the present invention is to provide a weight scale comprising a plurality of self-contained load modules having a strain gauge for sensing weight in response to loading of a flexible fluid container, means for electronically adding the weight sensed by the strain gauge for producing a signal representative of the total weight and means for displaying a visual indication of the total weight in response to the signal.

Also in accordance with the objects and features of the inventions, a weight scale includes two flexible members, four support members and four force transmitting members constructed and arranged to obtain desired flexure of the flexible members with inexpensively made and assembled parts.

In particular, the flexible members are long, thin and high and are stamped from such as sheet metal material to be flat. Each flexible member carries a pair of resistive strain gauges adhesively secured on the top surface and bottom surface thereof for sensing the tension and compression of the flexible member at those surfaces. Each flexible member also includes a pair of top notches adjacent the ends of the member and extending into the top surface thereof and a pair of bottom notches extending into the bottom surface thereof and spaced inwardly from the ends of the flexible member. In the preferred embodiment, the notches all are in the shape of a "V".

The four supporting members are carried by the foot member substantially at the corners thereof. Each support member is a flat piece of metal that can be stamped to form an upward opening notch presenting an edge therein. The support members are received in mounting blocks molded to the foot member rigidly to maintain them vertically arranged and fixed in position. The upwardly opening notch in each support member is aligned with a bottom notch in the flexible members to suspend the flexible members over the foot member. In the preferred embodiment, the foot member is a molded plastic part with standard portions providing the mounting means for the support members in the form of upwardly opening slots into which the support members are dropped. The support members become maintained in the slots by fasteners such as screw heads retaining the support members therein.

The four force transmitting members also comprise small stamped parts with downwardly opening notches terminating at fulcrum edges therein. Each force transmitting member is secured to the force receiving member by a bracket. Such brackets are made in the preferred embodiment to a "U" shape by bending a stamped member to form two sidewalls and a base and suspending the force transmitting members therein with side trunnions captured in small slots in the sidewalls. The brackets become secured to the force receiving member by any means desired such as by spot welding. The fulcrum edges of the force transmitting members stand aligned with the top notches in the flexible members and engaged therewith.

These flexible members, support members, force transmitting members, foot member, brackets and force receiving members easily are manufactured and assembled to obtain a less expensive weight scale.

BRIEF DESCRIPTION OF THE DRAWINGS

The foregoing objects, features and advantages will be described in greater detail, and further objects, features and advantages will be made apparent in the detailed description of the preferred embodiment which is given with reference to the several views of the drawing, in which:

FIG. 1 is a cross sectional side view of a preferred embodiment of one form of the strain gauge assembly of the present invention;

FIG. 2A is a sectional end view of the strain gauge assembly taken along section line II-II of FIG. 1;

FIG. 2B is a plan view of a portion of the flexible member and foot member which more clearly illustrates the restraint member shown in FIG. 1;

FIG. 3 is a schematic illustration of the flexing of a flexible member resulting from the application of forces to the neutral plane thereof;

FIGS. 4A and 4B are schematic illustrations of the encircled area of FIG. 3 of prior to and after flexing, respectively, to illustrate the resultant apparent foreshortening of the flexible member which the present invention is designed to overcome;

FIGS. 5A and 5B are schematic illustrations of the flexible member of the strain gauge assembly of the present invention before and after flexing, respectively, and illustrating the manner in which the foreshortening problem is overcome;

FIG. 10 is a block diagram of another form of the weight scale of the present invention;

FIG. 11 is a side sectional view of the form of the strain gauge assembly of the weight scale of the invention represented in FIG. 10; and FIG. 12 is a partial end sectional view taken along the line 12—12 of FIG. 11 and in the direction indicated by the arrows.

DETAILED DESCRIPTION OF THE PREFERRED EMBODIMENT

Figure 6:
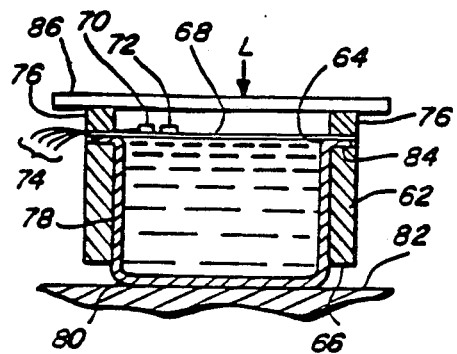
FIG. 6 is a cross sectional side view of another embodiment of a strain gauge assembly of the present invention which employs a flexible diaphragm instead of an elongate flexible member.

Referring now to the drawings, particularly FIGS. 1 and 2A, the flexible member strain gauge assembly of the present invention is seen to include an underlying rigid, foot, or frame, member 10, an elongate flexible member 12, an elongate rigid force, or load, receiving member 14, a pair of underlying support members 16 and 18 and a pair of force transmitting members 20 and 22. The foot member 10 has a rectangular bottom plate 24 and two pairs of opposite sidewalls 26 and 28 surround its perimeter to form an open box. Similarly, the rigid force receiving member 14 has an upper force, or load, receiving rectangular plate 30 with two pairs of downwardly extending, opposite sidewalls 32 and 34 interconnected around the perimeter to form another open box. As seen, the box of force receiving member 14 is larger than the box of foot member 10 and fits over it so that the sidewalls 26, 28, 32 and 34 and rectangular plates 24 and 30 protectively envelop an surround the remaining portion of the strain gauge assembly. In addition to this protective feature, the box-like configuration of the foot member 10 and force receiving member 14 also advantageously increases their rigidity.

A pair of strain gauges 36 and 38 are respectively mounted to a pair of opposite surfaces 40 and 42 of flexible member 12. These semiconductor strain gauges 36 and 38 are located intermediate, preferably centrally, of support members 16 and 18 and have pairs of leads 44 and 46. These pairs of leads extend from the strain gauges within the protective enclosure formed by foot member 10 and force receiving member 14 to without the enclosure for connection with external circuitry. As is well known, when the semiconductor strain gauges 36 or 38 are compressed or tensed upon application of a load to the force receiving member which causes the flexible member to flex, they change resistance an amount which is related thereto. This resistance change is produced across the pairs of leads 44 and 46 to develop a signal representative of the load applied to the strain gauge assembly.

In keeping with another important aspect of the present invention, the flexible member 12 has two pairs of notches 48 in underlying surface 42 and a pair of notches 50 in overlying surface 40. Both of these pairs of notches extend from their respective surfaces to a preselected distance X from a central neutral plane 52 extending through the center of the flexible member 12. The support members 16 and 18 and force transmitting members 20 and 22 have knife edges which extend into these notches and the forces applied thereby are thus applied to the flexible member 12 at this preselected distance X from the neutral plane 52.

This advantageously alleviates the problems resulting from apparent foreshortening of the flexible member 12 when it is flexed as illustrated in FIGS. 3, 4A and 4B. Referring to FIG. 3, an elongate flexible member has notches similar to those shown in FIG. 1 but which extend to the neutral plane 12. Accordingly, the distance A between the point of application of the load force L by the transmitting member 20 or 18 and the point of application of the resultant force R by the support member 16 or 22, respectively, varies due to the flexing of neutral plane 12.

Referring to FIG. 4A, when the load force and resultant force is zero or a very small value such that there is no significant flexing, the distance between the points of application of the load force L and resultant force R is a certain preselected distance "a" measured in a lateral direction parallel to the elongate directions of foot member 10 and force receiving member 14. However, referring to FIG. 4B, after a sufficient load force L and resultant force R is developed to cause flexing of the neutral plane 12 the distance between the points of application of these forces to the neutral plane measured in the lateral direction is reduced to a distance "a'" which is less than distance "a".

Consequently, since the foot member 10 and force receiving member 14 are rigid and do not flex, to the extent that one of the support members and one of the force transmitting members does not laterally move to follow the lateral movement of the point of the notch the load force L and resultant force R is applied to the flexible member 12 in a direction which is offset by a angle B that is offset from the transverse direction to the force receiving member 14 and foot member 10. To the extent that one of the support member and associated force transmitting member and the associated support member is resisted by friction, flexing of the flexible member is restrained. Accordingly, as the load is increased and the flexible member 12 flexes more and more and friction increases, an increasing component of the load force is directed in a non-transverse direction which results in a non-linear relationship between the load force and degree of flexing. That is, the greater the flexible member 12 is flexed, the greater the amount of force is required for a further increment of flexure.

Referring to FIGS. 5A and 5B, in the present invention this problem is substantially alleviated by application of the load and resultant forces to the flexible member 12 at a preselected distances X1 and X2 offset from the neutral plane 52 as illustrated in FIG. 5A. As seen in FIG. 5B, this additional distance X from the neutral plane creates a corresponding additional distance a1" and a2" at opposite ends of the segment of the flexible member 12 between the point of application of the load force and the resultant force. When these are added to the foreshortened distance a' between points of application at the neutral plane maintenance of an overall distance "a" is achieved. Accordingly, the amount of movement of the movable support member and force transmitting member is reduced, and the friction associated with such movement, sliding or otherwise, is thereby eliminated. Preferably, distances X1 and X2 are equal to each other and thus distances a1" and a2" are equal.

Referring again to FIG. 1, another advantageous feature of the present invention is the provision of a movably mounted support member 16 and a movably mounted force transmitting member 22 which are mounted to their associated foot member 10 and force receiving member 14 for non-sliding movement therealong. Again, due to the apparent foreshortening of the flexible member when flexed, it is necessary that at least one of the support members or its associated force transmitting member be permitted to move laterally as the flexible member is flexed. While movement between members by sliding one laterally relative to the other would work in the present structure, it is not preferred. When heavy loads are applied, this sliding motion is resisted by high frictional forces which impede free movement and thus impede the proper and free flexing of the flexible member in response to the load. Thus, again as the load is increased, each additional increment of flexing requires a greater increment of force to overcome the frictional force.

This problem caused by high friction and the resultant nonlinearity is preferably alleviated in accordance with the invention by providing a support member 16 and a force transmitting member 22 which is designed to non-slideably move along the surface of its associated foot member 10 and force receiving member 14. Preferably, this non-sliding movement is a pivotal, rocking movement although a rolling movement is also contemplated. In particular, referring to FIG. 1, each of the movable support members 16 and force transmitting member 22 have an elongate knife edge member 54, the distal end of which extends into the associated notch. The distal end is supported above a base member 56 having an arcuate surface, preferably circular, to provide for rocking motion. Alternately, the base is provided with underlying ball bearings or the like for rolling motion. The frictional force resisting the rocking or rolling motion is, of course, substantially less than the frictional force to overcome sliding movement, and thus linearity is substantially enhanced. The remaining support member 18 and force transmitting member 20 may have a base 58 fixedly attached to its associated foot member 10 or force receiving member 14 and a knife edge portion 60 extending into the associated notch.

Referring to FIGS. 1, 2A and 2B, four restraint members 53 are provided for holding together the assembly of the foot member 10, flexible member 12 and the load receiving member 14 in the absence of a load. These restraint members are in the form of resilient straps made of plastic or the like and are mounted directly over the associated notches 48 and 50. Two of them have their opposite ends 55 mounted to the opposite sides of the foot member and extend over the top surface 40 of the flexible member to hold the flexible member 12 against the support members 16 and 18 in the absence of a load. Knife edges 57 fit into small grooves 59 in the top surface 40 at the opposite sides thereof to restrain the flexible member 12 and foot member 10 against relative lateral movement. The other pair of restraint members have their opposite ends 55 mounted to the opposite sides of the load receiving member and extend over the bottom surface 42 of the flexible member 12 against the load transmission members 20 and 22. Likewise, knife edges 61 fit into grooves at opposite sides of surface 42 to prevent relative movement.

Figure 7A:
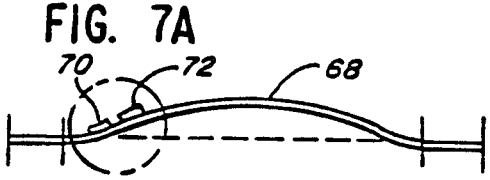
FIGS. 7A and 7B are schematic illustrations of the location of the strain gauges on the flexible diaphragm of the strain gauge assembly of FIG. 6 at tensive and compressive sections of the diaphragm.
Figure 7B:
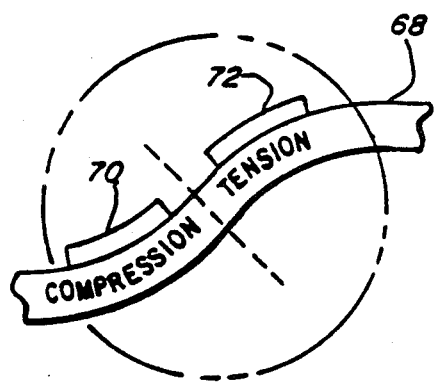

Referring now to FIGS. 6, 7A and 7B, another embodiment of a strain gauge assembly employing a flexible diaphragm instead of an elongate flexible member will be described. The strain gauge assembly of FIG. 6 comprises a hollow restraint member 62 having an upper open end 64 and an opposite lower open end 66. This restraint member is rigid and resists movement in a direction transverse to the direction between its open ends. A flexible diaphragm 68 has a pair of strain gauges 70 and 72 attached to an upper surface thereof to provide an electrical signal indicative of weight. Each of these strain gauges 70 and 72 have a pair of leads 74 for connection with external circuitry. The metal diaphragm 68 is mounted around its periphery to the hollow restraint member 62 by means of a member 76 which clamps it against the upper end of restraint member 62 to close the open end 64. A sealed flexible container 78 made of rubber, flexible plastic or the like contains a fluid, such as oil, which is in pressure communication with the underside of diaphragm 68.

Preferably, the flexible membrane 68 closes the open end of the flexible container 78 and the fluid is in direct pressure communication, as shown. Alternately, the flexible container has a sealed top and the fluid is in indirect pressure communication with the flexible membrane by pressing the upper portion of the flexible container surface against the membrane. The sealed flexible container 78 is substantially contained within the confines of the restraint member 62 which restrains it from lateral movement. However, it has a portion 80 which protrudes from the lower open end 66 to support the restraint member 62 above a floor surface 82 against a load L. A member 76 which extends around the periphery of restraint member 62 and clamps both the diaphragm 68 and a peripheral lip portion 84 of flexible container 78. This member 76 also functions to transmit a load force L to the restraint member 62 and thus to sealed flexible container 78 from a force receiving and distribution member 86.

When a load L is applied to force receiving and distribution member 86, the bottom surface of the protruding portion 80 of sealed flexible container 78 is pressed upwardly which is translated into an increase in fluid pressure that causes the diaphragm 68 to flex upwardly. Because the force on the diaphragm is applied by a fluid, the loading is uniformly distributed across the underlying surface of the diaphragm 68.

As seen in FIGS. 6, 7A and 7B, this causes the strain gauge 70 to be compressed and the strain gauge 72 to be placed in tension. These strain gauges 70 and 72 are interconnected in a suitable bridge network (not shown) for temperature compensation and to produce a suitable composite output signal representative of weight.

Figure 8:
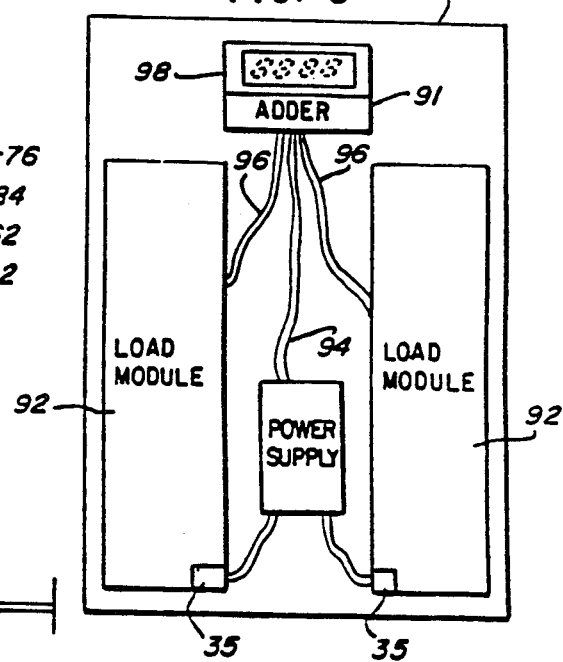
FIG. 8 a schematic illustration of a weight scale employing the strain gauge assemblies, or load modules, of FIGS. 1 or 6.
Figure 9:
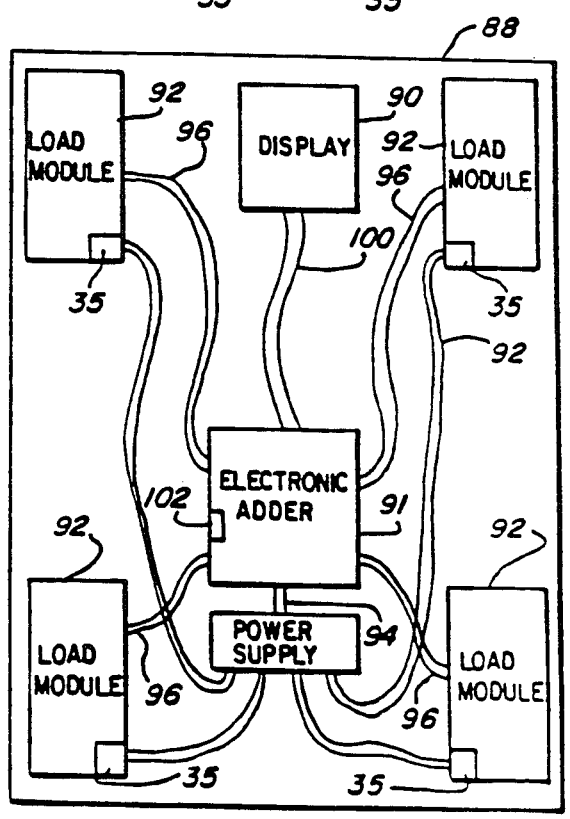
FIG. 9 is a schematic illustration of another form of the weight scale of the present invention employing the strain gauge assemblies, or load modules, of FIGS. 1 or 6.

Referring now to FIG. 8 and FIG. 9, two embodiments of a weight scale of the invention suitable for employment of the strain gauge assemblies of either FIG. 1 and 2 or FIG. 6 is shown. As seen in FIG. 8, the weight scale has a housing 88 containing a display 90 for providing a visual indication of weight in response to signals from a suitable electronic adder circuit 91. The electronic adder circuit 91 produces an average weight signal representative of the average weight or load applied to a pair of substantially identical strain gauge assemblies or load modules 92. These load modules 92 preferably comprise the load modules or strain gauge assemblies shown in FIG. 1 and 6 and described above, but self-contained load modules of other construction could be successfully employed. The housing also contains a DC power supply, such as a dry cell battery, which is connected to power the electronic adder 91 by means of leads 94. Each of the load modules are likewise connected to electronic adder 91 by means of leads 96. As seen in FIG. 8, the adder 91 and display 90 are contained in a common housing 98. In FIG. 9, the weight scale is substantially identical to that of FIG. 8, except that the adder 91 is separate from the display 90 and four substantially identical load modules 92 are employed instead of only two. Electronic adder is connected to the display, preferably a digital electronic display, by means of leads 100.

In both scales of 8 and 9, when employing a load module such as shown in FIG. 1 which contains a switch 34, the switch 34 is connected with the power supply 94 and interrupts application of power to the electronic adder except when a load exceeding a preselected minimum load, such as twenty pounds, is applied. With plural switches 34, the switches are connected in series, so that each load module requires a minimum load before the application of power to the electronic adder and display. An additional switch 102, associated with electronic adder 91, may be provided to adjust the adder for calibration purposes.

In FIG. 10, the invention provides a weight scale 108 having parts or assemblies indicated in block form. Weight scale 108 includes an underlying rigid foot member 110, a pair of elongate flexible members 112, 113, and an overlying rigid force receiving member 114.

The flexible members 112, 113 become suspended between the foot member 110 and the force receiving member 114 through four underlying support means 116, 117, 118 and 119, and through four force transmitting means 120, 121, 122 and 123. Support means 116-119 are carried to foot member 110 while the force transmitting means 120-123 are carried to the force receiving member 114.

Weight scale 108 also includes electronic display means 126, electronic adder means 128 and power supply 130 that operate on the same principles previously discussed in connection with display 98, adder 91, display 90, electronic adder 102 and the power supplies illustrated in FIGS. 8 and 9. Also, force receiving member 114 includes a window 130 for transmission of the characters produced by display 126 when the force receiving member 114 becomes aligned, superimposed over the foot member 110 in normal operation.

In FIGS. 11 and 12, foot member 110 comprises a rectangular bottom plate 132 and two pairs of opposite sidewalls 134 and 136 surrounding its perimeter to form an open box opening upwardly. Similarly, the force receiving member 114 has a rectangular receiving plate 138 and two pairs of depending opposite sidewalls 140 and 142 interconnected around the perimeter thereof to form another box opening downwardly. The box of force receiving member 114 is larger than the box of foot member 110 and fits over it so that the sidewalls 130, 132, 140 and 142 and rectangular plates 132 and 138 protectively envelope and surround the remaining portion of the weight scale.

Flexible member 112 is an elongate, high and thin piece part that has been stamped from such as a sheet of metal to be flat. It is suspended in the weight scale 108 with its height arranged vertically. Flexible member 112 presents a pair of "V"-shaped top notches 144 and 146 extending into the top surface 148 thereof. It also presents a pair of "V"-shaped bottom notches 150 and 152 extending into the bottom surface 154. Flexible member also carries a pair of resistive strain gauges 156 and 158 adhesively secured to the top and bottom surfaces 148 and 154 thereof. Wires 160 connect the strain gauges to the adder 128 and display 126.

Flexible member 112 is identical to the flexible member 113 so that a description of member 112 is a description of member 113. Flexible members 112 and 113 are arranged in the weight scale 108 substantially parallel to each other and spaced apart. In the preferred embodiment, each flexible member substantially rests aligned under the locations of the force receiving member 114 that receive the feet of the user.

Support means 116, 117, 118 and 119 each are alike so that a description of one substantially describes all four. Support means 117 comprise a mounting block 162 made of molded plastic material. In the preferred embodiment, mounting block 162 is integrally molded with the base plate 132 of the foot member 110. Mounting block 162 is a rectangular structure providing a slot 164 therein for receiving a support member 166 therein. Support member 166 is a thin, flat, stamped rectangular piece part providing an upwardly opening slot 168 therein. The bottom of slot 168 terminates at a knife edge 170. The slot 168 and edge 170 are arranged aligned under the notch 150 and flexible member 112 so that the apex of the notch 150 engages with the edge 170. In conjunction with the like structure in mounting 116, the flexible member 112 becomes suspended vertically at the notches 150 and 152. The sidewalls 172 and 174 of the slot 168 maintain the flexible member 112 vertically aligned in the slot 168.

Force transmitting means 120–123 also are identical in construction and arrangement so that a description of one, such as force transmitting means 122, becomes a description of all. Force transmitting means 122 include a "U"-shaped bracket 176 carrying a force transmitting member 178 therein. Member 178 furnishes a pair of opposed trunnions 180 extending through openings 182 in the bracket 176. Crimped tips 184 prevent the trunnions 180 from passing out of the openings 182. Member 178 also includes a downwardly opening slot 186 terminating in a knife edge 188 aligned with top notch 144 of the flexible member 112. Force transmitting means 122 and 123 thus transmit the weight of the user received on the force receiving member 114 through the force transmitting members 178 to the singular flexible member 112 at the notches 144 and 146.

The notches 144 and 146 are offset inwardly from the notches 150 and 152 to induce a bending moment into flexible member 112 when the user rests his weight on the weight scale 108. This causes compression and tension in the flexible member 112 indicated by a resistance change in strain gauges 156 and 158. The electronic means of the display 156 and adder 128 can sense this resistance change to effect the visual display of the user's weight.

The sidewalls 190 and 192 of the force transmitting member 178 that form the slot 186 engage against the sides of the flexible member 112 also to maintain the member 112 vertical. The bracket 176 is formed as desired, such as by stamping a flat piece from sheet metal stock, bending up the two sides thereof and spot welding the same to the force receiving plate of the force receiving member 114.

This embodiment becomes easily manufactured by stamping individual members and the brackets and by injection molding the mounting blocks with the baseplate. In assembly, the pieces simply slip into one another in proper alignment with each other and the flexible member 112. Of course, the force mounting members that float in the brackets can be exchanged in position with the support members and their mounting blocks so that the force transmitting means are fixed in position while the support means float in position.

While particular and preferred embodiments of the invention have been disclosed, it should be appreciated that numerous variations may be made with respect thereto without departing from the scope of the invention as set forth in the following claims. For instance, although a particular arrangement of movable and non-movable support members and force transmitting members has been shown, some of the advantages of the invention could be obtained with other combinations and permutations.

I claim:

1. A weight scale providing a visual indication of the weight of a person standing thereon, said scale comprising:
   A. an underlying foot member having a rectangular bottom plate and two pairs of opposite sidewalls around the perimeter of the bottom plate to form an upwardly opening box;
   B. flexible means suspended in said box for flexing an amount directly related to the weight of said person standing on said scale, said flexible means including two flexible members that are long, thin, high and flat that are suspended in said box with their heights arranged vertically, said flexible members being spaced apart and parallel to one another, each flexible member including a pair of top notches extending into the top surface thereof and a pair of bottom notches extending into the bottom surface thereof, each flexible member also carrying a pair of resistive strain gauges adhesively secured to the top and bottom surfaces thereof;
   C. support means for suspending said flexible means in said foot member, said support means including at least four support members carried by said foot plate, one of said support members being located at approximately each of the four corners of said foot member under the flexible members and aligned with said pairs of bottom notches of said flexible members, each support member furnishing an edge that is engaged with a bottom notch of said flexible members;
   D. an overlying force receiving member adapted to receive the weight of said person, said force receiving member having a rectangular receiving plate with two pairs of opposite sidewalls depending from the perimeter of said plate to form a downward opening box that is wider than the box of said foot member and arranged thereover to enclose said flexible means and support means;
   E. force transmitting means for transmitting weight received at said force receiving member to said flexible means and particularly to said flexible members, said force transmitting means including at least two pairs of transmitting members carried by said receiving plate over said flexible members and aligned with said pairs of top notches thereof, each of said transmitting members furnishing an edge that is engaged with a top notch of said flexible members, said pairs of transmitting members being floating in position to permit horizontal movement of said force transmitting means and said flexible members relative to one another; and F. electronic means connected to said strain gauges for displaying a weight indication in response to flexure of said flexible members sensed by said strain gauges.

2. The weight scale of claim 1 in which each said support member includes an upwardly opening slot presenting said edge at the bottom thereof with side walls at the sides of said opening, the side walls of said support member engaging with the sides of said flexible member to maintain the flexible member vertical.

3. The weight scale of claim 1 in which said top and bottom notches are "V" shaped.

4. The weight scale of claim 1 in which said support means include four mounting blocks carried by said foot plate at approximately the four corners of said foot plate, each mounting block presenting an upwardly opening slot receiving and retaining a support member therein.

5. A weight scale providing a visual indication of the weight of a person standing thereon, said scale comprising:
   A. an underlying foot member having a rectangular bottom plate and two pairs of opposite sidewalls around the perimeter of the bottom plate to form an upwardly opening box;
   B. flexible means suspended in said box for flexing an amount directly related to the weight of said person standing on said scale, said flexible means including two flexible members that are long, thin, high and flat that are suspended in said box with their heights arranged vertically, said flexible members being spaced apart and parallel to one another, each flexible member including a pair of top notches extending into the top surface thereof and a par of bottom notches extending into the bottom surface thereof, each flexible member also carrying a pair of resistive strain gauges adhesively secured to the top and bottom surfaces thereof;
   C. support means for suspending said flexible means in said foot member, said support means including at least four support members carried by said foot plate, one of said support members being located at approximately each of the four corners of said foot member under the flexible members and aligned with said pairs of bottom notches of said flexible members, each support member furnishing an edge that is engaged with a bottom notch of said flexible members;
   D. An overlying force receiving member adapted to receive the weight of said person, said force receiving member having a rectangular receiving plate with two pairs of opposite sidewalls depending from the perimeter of said plate to form a downward opening box that is wider than the box of said foot member and arranged thereover to enclose said flexible means and support means;
   E. force transmitting means for transmitting weight received at said force receiving member to said flexible means and particularly to said flexible members, said force transmitting means including at least two pairs of transmitting members carried by said receiving plate over said flexible members and aligned with said pairs of top notches thereof, each of said transmitting members furnishing an edge that is engaged with a top notch of said flexible members, at least one of said transmitting members from each said pair being floating in position; and
   F. electronic means connected to said strain gauges for displaying a weight indication in response to flexure of said flexible members sensed by said strain gauges.

6. The weight scale of claim 5 in which said force transmitting means include four brackets carried by said receiving plate over the flexible members and aligned with said pairs of top notches thereof, each of said brackets carrying said one of said force transmitting members floating therein.

7. The weight scale of claim 6 in which each bracket is "U" shaped and presents opposed openings therein narrowed by tips, said transmitting members include trunnions extending therefrom and said trunnions are retained within said closed openings.

8. The weight scale of claim 6 in which said brackets are welded to said receiving plate.

9. A weight scale providing a visual indication of the weight of a person standing thereon, said scale comprising:
   A. an underlying foot member having a rectangular bottom plate and two pairs of opposite sidewalls around the perimeter of the bottom plate to form an upwardly opening box;
   B. flexible means suspended in said box for flexing an amount directly related to the weight of said person standing on said scale, said flexible means including two flexible members that are long, thin, high and flat that are suspended in said box with their heights arranged vertically, said flexible members being spaced apart and parallel to one another, each flexible member having a central plane from which the top surface and bottom surface thereof are equidistant, each flexible member including a pair of top notches extending downwardly into the top surface thereof to a first non-zero preselected distance from the said central plane, and a pair of bottom notches extending upwardly into the bottom surface thereof to a second non-zero preselected distance from the said central plane, each flexible member also carrying a pair of resistive strain gauges adhesively secured to the top and bottom surfaces thereof;
   C. support means for suspending said flexible means in said foot member, said support means including four support members carried by said foot plate at approximately the four corners of said foot member under the flexible members and aligned with said pairs of bottom notches of said flexible members, each support member furnishing an edge that is engaged with a bottom notch of said flexible members;
   D. an overlying force receiving member adapted to receive the weight of said person, said force receiving member having a rectangular receiving plate with two pairs of opposite sidewalls depending from the perimeter of said plate to form a downward opening box that is wider than the box of said foot member and arranged thereover to enclose said flexible means and support means;
   E. force transmitting means for transmitting weight received at said force receiving member to said flexible means and particularly to said flexible members, said force transmitting means including four transmitting members carried by said receiving plate over the flexible members and aligned with said pairs of top notches thereof, each transmitting member furnishing an edge that is engaged with a top notch of said flexible members; and F. electronic means connected to said strain gauges for displaying a weight indication in response to flexure of said flexible members sensed by said strain gauges.

10. The weight scale of claim 9 wherein the first non-zero preselected distance is substantially equal to the second non-zero pre-selected distance.

* * * * *